United States Patent Office 3,106,583
Patented Oct. 8, 1963

3,106,583
PRODUCTION OF LIQUID ALKYLATED PENTABORANE
Jack R. Gould, Monsey, N.Y., and David M. Gardner, Dover, and John E. Paustian, Whippany, N.J., assignors, by mesne assignments, to Thiokol Chemical Corporation, a corporation of Delaware
No Drawing. Filed June 3, 1957, Ser. No. 663,313
3 Claims. (Cl. 260—606.5)

This invention relates to the manufacture of alkylated pentaboranes and, in particular, to the alkylation of pentaborane-9 with olefin hydrocarbons using various catalysts. The products produced in accordance with the method of this invention can be used as fuels when burned with air, as described in the application of Chiras and Mezey, Serial No. 501,742, filed April 15, 1955.

Pentaborane-9 may be prepared by methods which are described in the art; it is a colorless liquid which melts at −46.8° C. The boron hydrides, and pentaborane-9 in particular, because of their high heats of combustion, have been recognized as materials which are potentially of value as high energy fuels. The burning of these materials with oxygen liberates considerably more energy than the oxidation of a corresponding weight of hydrocarbon, producing a very high flame temperature. Pentaborane-9 suffers from several disadvantages when used as a liquid fuel. Thus it has a very disagreeable odor, it has a relatively high vapor pressure, its vapor pressure being 66 mm. of mercury at 0° C. and its boiling point at atmospheric pressure being 58° C., and its vapors are highly toxic.

One of the objects of this invention is to provide a method for producing high energy liquid products from pentaborane-9 which are less volatile and less toxic than pentaborane-9 but at the same time approach pentaborane-9 in heats of combustion. In accordance with the present invention, it has been found that monoolefin hydrocarbons containing from two to four carbon atoms can be reacted with pentaborane-9 in the presence of certain catalysts which consist essentially of from 80 to 95 percent by weight of silica and from 5 to 20 percent by weight of alumina, magnesia or zirconia to form alkylated pentoboranes which are stable non-volatile liquids with convenient handling characteristics. The catalysts employed in accordance with this invention are of a type which is commonly used in the petroleum industry for the purpose of cracking straight-run gas oil to produce cracked gasoline and other products. Thus, among the catalysts which can be utilized are silica-alumina, silica-magnesia, silica-alumina-magnesia, silica-zirconia, silica-alumina-zirconia and the like. The presence of these catalysts reduces the time, temperature and pressure necessary for the reaction to proceed satisfactorily, and increases the yields of the alkylated pentaboranes. The reaction temperature is within the range from 75° C. to 250° C., the reaction pressure is from atmospheric to 500 p.s.i.g., and the molar ratio of monoolefin hydrocarbon to pentaborane-9 introduced into the reaction zone is within the range from 1:1 to 5:1.

The following example illustrates an embodiment falling within the scope of the invention. In the example, the term "moles" signifies gram moles.

*Example*

This experiment was conducted in a closed system, gas recycling apparatus consisting of a reactor bed made of glass 12 inches high and ½ inch in diameter, inserted in an electrically heated furnace. This bed was positioned vertically and a glass tube leading from the bottom thereof extended into the interior lower portion of a 100 ml. glass container which served as a trap. A second tube led from the upper portion of this trap into a stainless steel bellows type circulating pump and from there to a 200 ml. spherical shaped surge bulb. The tube then extended through a conventional type gas flow meter and into the bottom portion of a 2 liter gas storage and mixing vessel. A manometer led from the tube just previous to its entrance into the mixing vessel. A tube led from the upper portion of the mixing vessel to the upper portion of the reactor bed. A vacuum apparatus was affixed to the system to permit evacuation when desired, and an inlet provided through which gases could be introduced into the system at will. 10 grams of pelletized silica-magnesia catalyst composed of approximately 80 percent by weight of silica and 20 percent by weight of magnesia and having a size of approximately 8–12 mesh was placed in the reaction bed and the system was evacuated.

47 millimoles of propylene and approximately 87 millimoles of pentaborane-9 were then introduced into the system, the amounts of the two gases introduced being sufficient to raise the pressure in the system to atmospheric pressure. The circulating pump was then started and adjusted to circulate the gaseous constituents through the system at 100–250 cubic centimeters per minute (S.T.P.), and the temperature of the reactor bed was raised to 160–195° C. by means of the electrically heated furnace. The manometer indicated a pressure drop signifying that a reaction was taking place. Additional pentaborane-9 was admitted into the system throughout the reaction to maintain the pressure at atmospheric pressure. When the apparatus had recycled the gaseous reactants 18 times (total apparatus volume 3000 cc.), the heating elements were turned off, the apparatus was allowed to cool and the gaseous contents were removed by the vacuum apparatus. The liquid which had condensed in the trap below the reactor bed was then removed, analyzed chemically and by infrared and found to be a mixture of monopropylpentaborane ($C_3H_7B_5H_8$) and tripropylborane. The monopropylpentaborane was isolated by vacuum distillation and weighed 0.509 gram (4.84 millimoles). The yield was 24 percent, based upon the propylene consumed.

It is claimed:
1. A method for the production of a liquid alkylated pentaborane which comprises reacting a monoolefin hydrocarbon having from 2 to 4 carbon atoms and pentaborane-9 at a temperature within the range from 75° C. to 250° C. and at a pressure from atmospheric pressure to 500 p.s.i.g. while the reactants are in contact with a catalyst consisting essentially of from 80 to 95 percent by weight of silica and from 5 to 20 percent by weight of at least one metal oxide selected from the group consisting of alumina, magnesia and zirconia, the molar ratio of said monoolefin hydrocarbon to pentaborane-9 introduced into the reaction zone being within the range from 1:1 to 5:1.
2. The method of claim 1 wherein the monoolefin hydrocarbon is propylene.
3. The method of claim 1 wherein the monoolefin hydrocarbon is propylene and wherein said catalyst consists essentially of silica and magnesia.

No references cited.